(No Model.)
G. P. G. & C. G. RIVES.
APPARATUS FOR AUTOMATICALLY SHUTTING OFF WATER.
No. 458,496. Patented Aug. 25, 1891.
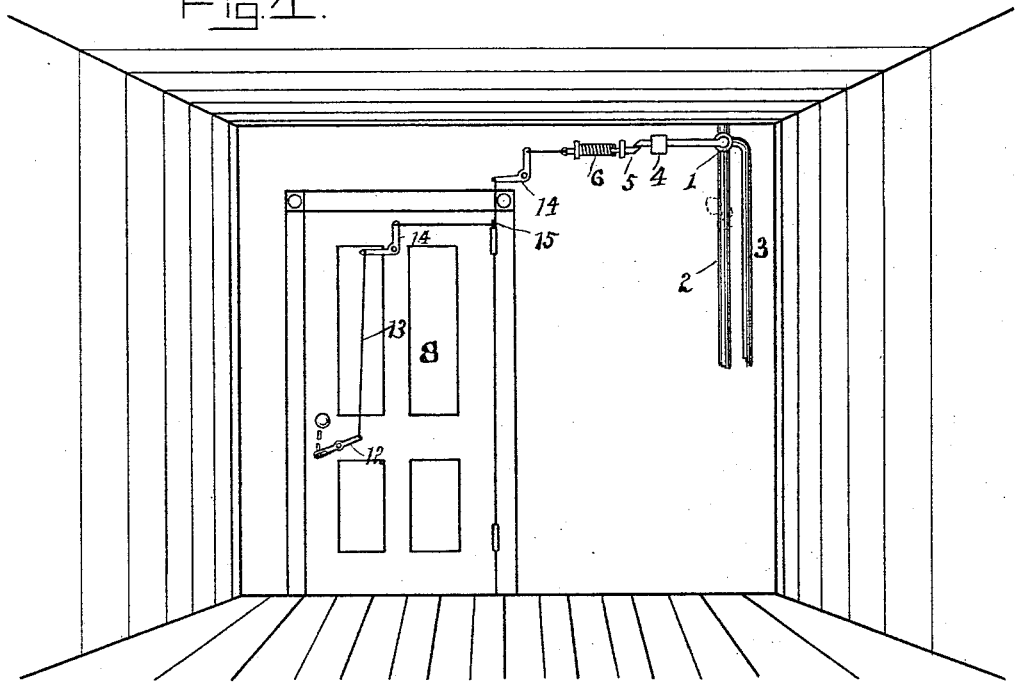
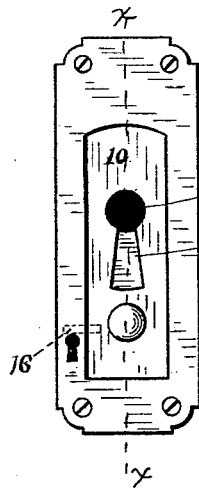 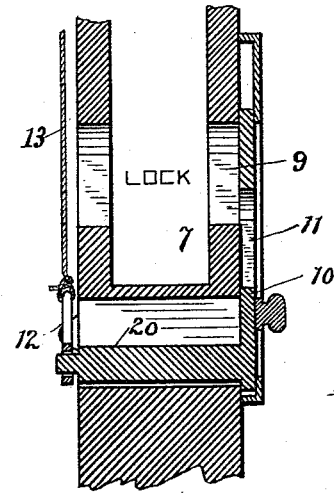 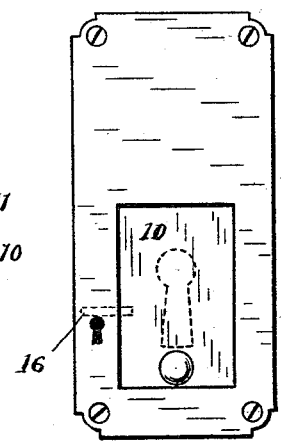
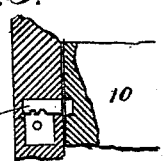

UNITED STATES PATENT OFFICE.

GEORGE P. G. RIVES, OF ROCHESTER, NEW YORK, AND CHARLES G. RIVES, OF JERSEY CITY, NEW JERSEY, ASSIGNORS OF ONE-FOURTH TO GEORGE C. VOGT, OF ROCHESTER, NEW YORK.

APPARATUS FOR AUTOMATICALLY SHUTTING OFF WATER.

SPECIFICATION forming part of Letters Patent No. 458,496, dated August 25, 1891.

Application filed February 9, 1891. Serial No. 380,757. (No model.)

*To all whom it may concern:*

Be it known that we, GEORGE P. G. RIVES, of Rochester, in the county of Monroe and State of New York, and CHARLES G. RIVES, of Jersey City, in the county of Hudson and State of New Jersey, have invented certain new and useful Improvements in Apparatus for Automatically Shutting off Water; and we do hereby declare the following to be a full, clear, and exact description of the same, reference being had to the accompanying drawings, forming a part of this specification, and to the figures of reference marked thereon.

Our present invention has for its object to provide means for preventing the freezing of water-pipes in stores, warehouses, buildings, or other places accessible through a door by automatically shutting off the supply to the building when or before the key for locking the door is inserted in the lock; and it consists in certain novelties of construction and combinations of parts hereinafter described, and specifically pointed out in the claims at the end of this specification.

In the drawings, Figure 1 is a view of the rear of a door, showing the application of our invention; Fig. 2, a view of the lock-escutcheon; Fig. 3, a sectional view on the line $x$ $x$ of Fig. 2; Fig. 4, a view of a modification; Fig. 5, a detail section of the edge of the sliding key-hole cover, showing its securing-bolt.

Similar figures of reference indicate similar parts.

In carrying out our invention we employ an ordinary stop-cock 1 in the water-service pipe 2 in the building, to the casing of which cock is attached the usual drainage-pipe 3, operating when the supply from the main is cut off to permit the escape of the water in the pipes. The handle or arm of the cock is provided with a weight 4, formed integral with or attached thereto, so that when unsupported it will assume the position in dotted lines and cut off the supply from the main and permit the water above the cock to escape into the drain through the pipe 3. Said valve-arm, however, is normally supported by a bolt or catch 5, arranged to be projected by a spring 6 in its path, and it is only when the bolt is retracted by the means about to be described that the arm may be permitted to fall and shut off the water.

The lock 7 of the door 8, which is the one permitting access to the building or apartment, is or may be of the usual or any preferred construction; but the key-hole is provided with an escutcheon, as shown in Figs. 2 and 3, having an aperture 9 for the insertion of the key and in front of this a sliding plate or guard 10, having either an aperture 11, which must register with the aperture 9 in the escutcheon before the key can be inserted to fasten the door, or said plate may be in the form of a plate to be raised above said aperture 9, and thus permit access to the key-hole, as in Fig. 4. In the preferred form of this device the guard-plate 10 is arranged to slide in suitable guides in the escutcheon and is provided with an arm 20, operating in a slot in one end of a pivoted lever 12, being connected by a wire or cord 13 or equivalent means with the bolt 5 for sustaining the weighted arm of the valve, so that the movement of the guard-plate in a direction to permit access to the key-hole proper 9 will retract said bolt 5 and permit the weighted arm of the cock 1 to drop and shut off the water in the building.

As in the present construction, the lock is located on the door and the valve and catch are stationary. Adequate means must be provided for supporting the wire or cord 13, so that its movements will be communicated without fail to the bolt, and also to prevent the shortening of the cord or wire when the door is opened, and we therefore provide suitable bell-cranks 14 at the corners where the wire changes its direction and extend the wire from the door to the casing on a line with the center of hinges of the door, a suitable guide loop or eye 15 being located at this point, as will be understood.

For the purpose of preventing unwarranted interference with the cock-releasing mechanism during the day or while the water is to be turned on, we arrange upon the lock-escutcheon a suitable locking device, as a bolt 16, (indicated in Figs. 2 and 5,) serving to engage the guard-plate and retain it in position to permit the projection of bolt 5 and the sustaining of the cock-arm, which locking device must of course be released before the guard-plate can be actuated to permit access to the locking key-hole.

From the above description the operation will be apparent. The water is turned on during the day and the cock-arm sustained by the catch 5 and the guard-plate prevented from being actuated by the lock 16. Now when desired to lock the door to close the building the lock 16 must be unlocked and the guard 10 raised before access can be had to the key-hole, this operation retracting the catch 5 and allowing the weight to fall and shut off the water and drain off that contained in the pipes, so that they will not freeze and burst, overflowing the building. By thus providing means for actuating the valve when access is had to the securing-lock of the door there is no possibility of failure to shut off the water when the door is finally secured.

Instead of locating the lock and its guarded escutcheon on the door, it will be understood that it could be located on the casing, if desired; but we prefer the present arrangement, as we are enabled to apply our invention to the doors of buildings without in any way altering the present arrangement of parts.

While we could, of course, operate the stop-cock directly from the guard-plate, we prefer to employ the automatically-operated cock and the catch, as the amount of force required is considerably less and the operation will be just as certain.

The means for communicating motion from the guard-plate to the cock or catch may be other than cords or wires, as shown, and for turning corners, instead of the bell-crank levers, ordinary guide loops or eyes could as well be employed.

While we have described and prefer to employ the invention herein described in connection with water-pipes, it is obvious that substantially the same instrumentalities could be employed for turning off the gas in a building.

Instead of employing a vertically-sliding guard 10, as shown, it is obvious that the said guard could be pivoted or could slide laterally or be mounted in any way, so that it must be moved out of the way before the key can be inserted in the lock, as will be understood.

We claim as our invention—

1. The combination, with a water-service pipe for buildings containing an automatically-closing stop-cock and a catch for retaining the cock open, of a door, a lock for securing the door, having a key-hole, a guard for said key-hole, and connections between said guard and catch, whereby when the key is inserted in the lock the valve will be permitted to shut off the water, substantially as described.

2. The combination, with a water-service pipe for buildings containing an automatically-closing stop-cock and a catch for retaining said cock open, of a door, a lock for securing the door, having a key-hole, a guard for said key-hole, connections between said guard and catch, and a lock for securing the guard, substantially as described.

3. The combination, with a water-service pipe for buildings containing a stop-cock, of a door, a lock for securing the door, having a key-hole, a guard for said key-hole, and connections between the guard and stop-cock, whereby when the key is inserted in the lock the valve may be operated, substantially as described.

4. The combination, with a water-service pipe for buildings containing a stop-cock, of a door, a lock on the door for securing it, a guard for the key-hole of said lock, and connections between said guard and embodying a cord or wire extending from the door to the casing at the pivotal point of the door, whereby the door may be opened and closed without operating the stop-cock, substantially as described.

GEO. P. G. RIVES.
      CHARLES G. RIVES.

Witnesses as to G. P. G. Rives:
 FRED F. CHURCH,
 WILLIAM B. HALE.
Witnesses as to Chas. G. Rives:
 THOMAS F. BYNIE,
 JAS. HENDERSON.